United States Patent [19]

Mariën et al.

[11] 4,163,118
[45] Jul. 31, 1979

[54] BUSBAR SYSTEM OF ELECTRIC HIGH-VOLTAGE SWITCHGEAR

[75] Inventors: Pieter Mariën, De Meeren; Rintje Boersma, Harmelen; Gijsbert W. Irik, Bilthoven, all of Netherlands

[73] Assignee: Coq B.V., Utrecht, Netherlands

[21] Appl. No.: 888,779

[22] Filed: Mar. 21, 1978

[30] Foreign Application Priority Data

Apr. 19, 1977 [NL] Netherlands ................. 7704276

[51] Int. Cl.² .................................................. H02G 5/06
[52] U.S. Cl. .............................. 174/99 B; 174/129 B; 361/378; 200/284; 361/341
[58] Field of Search ............... 339/22 B; 361/341, 378; 174/99 B, 129 B, 133 B, 149 B, 99 E; 200/284

[56] References Cited

U.S. PATENT DOCUMENTS

| 455,339 | 7/1891 | Knight | 174/99 B |
|---|---|---|---|
| 2,932,686 | 4/1960 | Herrmann | 174/99 B |
| 3,346,776 | 10/1967 | Olashaw | 174/99 B |
| 3,924,161 | 12/1975 | Olashaw | 361/341 |

Primary Examiner—Gerald P. Tolin
Attorney, Agent, or Firm—John P. Snyder

[57] ABSTRACT

In electric switchgear for high voltages a busbar system, of which each busbar consists of two identical rod-shaped conductors which are fastened by bolts to supporting insulators in specularly symmetric fashion.

8 Claims, 5 Drawing Figures

BUSBAR SYSTEM OF ELECTRIC HIGH-VOLTAGE SWITCHGEAR

The invention relates to a busbar system of electric high voltage switchgear, in which each busbar is attached to insulators. In the known busbar system the busbar is fastened, for example, with the aid of a bracket to the insulator. This known busbar system has various disadvantages. It is, for example, difficult to secure the busbar to the insulator, whilst the replacement of an insulator requires dismounting of the entire busbar system. Moreover, in the already existing busbar systems the allowable thermal expansion is limited.

The invention has for its object to obviate the aforesaid disadvantages and to provide a busbar system, in which a simple construction with a limited number of parts goes with a simple assembly operation.

According to the invention this is achieved in that each busbar consists of two identical rods having each a longitudinal slot and being fastened to the insulators in specularly symmetric fashion by bolts engaging said slots. The mode of fastening by bolts engaging longitudinal slots of the rods permits the busbar of being secured in any desired place to an insulator. The specularly symmetric connection provides an optimally closed form which is important for the form of the potential field. The two busbar rods can be fastened independently on one another and displaced with respect to the insulator.

Preferably, the busbar rods are separated from one another by a gap. The presence of a gap enhances the heat dissipation so that the busbar has a higher energy transmitting capacity. Moreover, this gap gives a tool access to the fastening bolts. Provided between each busbar rod and an insulator is an electrically conductive fastening plate which extends parallel to the said rod. The fastening plate is rigidly secured to the rail rod and rotatably attached to the insulator. Since the insulator is rotatable with respect to the busbar, relative movements, for example, due to different thermal expansions, are possible.

In a multiphase busbar system, in which all rods are arranged in a common metal envelope, the rods of all phases can be supported by the prongs of a multi-pronged insulator common to all phases.

Each busbar directly supports a stationary contact of at least one multiphase isolator switch. The stationary contact is fastened to the busbar by a bolt engaging the slot of a busbar rod and extending through the legs of a U-shaped fastening member projecting from the contact.

The invention will be elucidated more fully with reference to an embodiment shown in the accompanying drawing.

In the drawing

Figure 1:
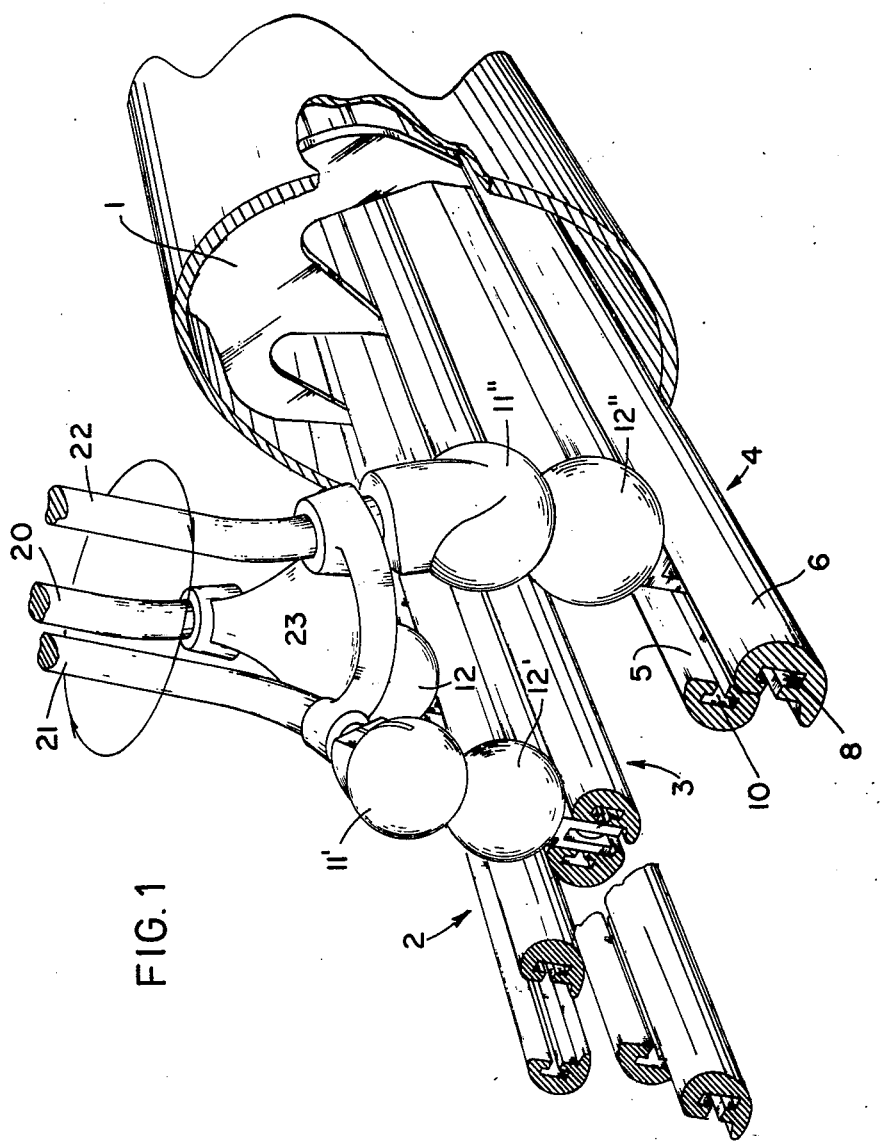
FIG. 1 is a perspective view of the busbar system according to the invention.
Figure 2:
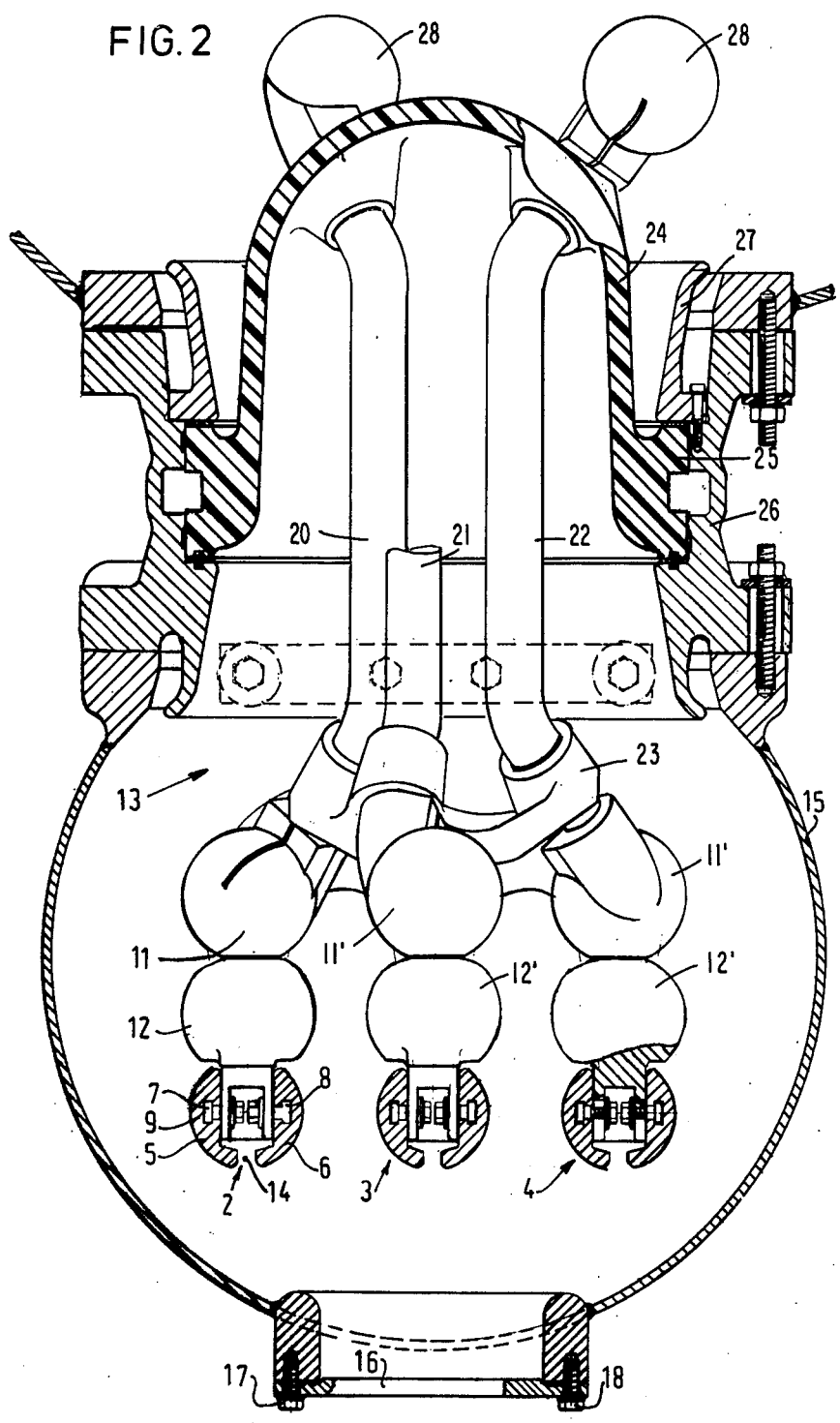
FIG. 2 is a sectional and elevational view of the connection of the stationary contacts with the busbars.
Figure 3:
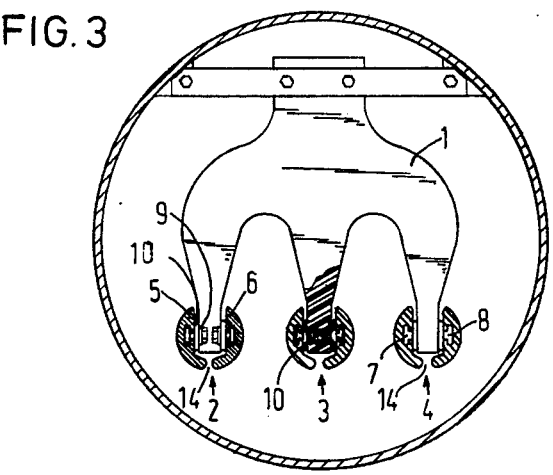
FIG. 3 is an elevational and sectional view of the connection of the busbar to the insulator.
Figure 4:
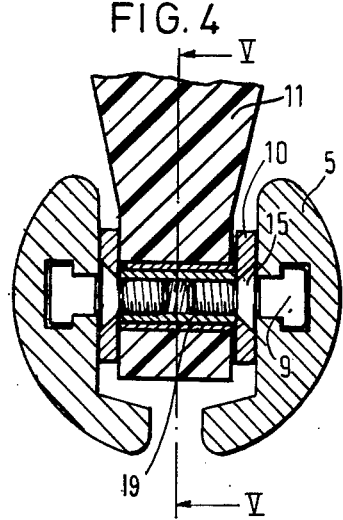
FIG. 4 is an elevational and sectional view of the connection between the fastening plate and the insulator and FIG. 5 is an elevational and sectional view taken on the line V—V it FIG. 4.
Figure 5:
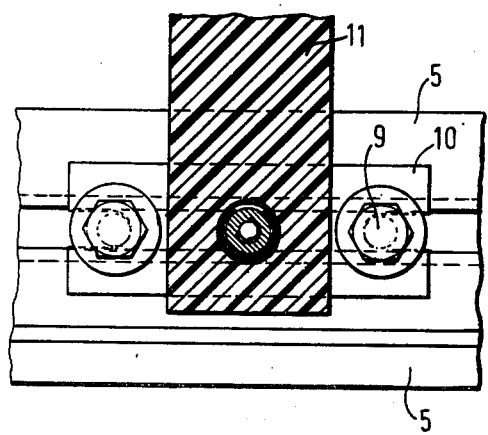

To the tridentate insulator 1 are fastened the busbars 2,3 and 4. Each busbar is associated with one of the phases. Each busbar consists of two rods, for example, 5 and 6 having each a longitudinal slot 7 and 8 respectively. The slot is engaged by a fastening bolt, for example, 9 which secures the rod 5 to a fastening plate 10. The fastening plate 10 is pivotally connected with the insulator by means of a countersunk bolt 15, which is inserted into a sleeve 19 rotatable in the insulator 11. The two rods 5 and 6 are fastened to the insulator in specularly symmetrical fashion and have a substantially closed shape towards the outer side so that air circulation is possible and the electric field is not adversely deformed. Secured to the busbar are the stationary contacts 12, 12' and 12" of the isolator switch 13. Left between the busbar rods 5 and 6 is a gap 14, which enhances the heat dissipation of the busbar. Opposite each isolator the busbar envelope is provided with a mounting cover 16 secured by a circular series of bolts 17, 18 to said envelope. The movable contacts 11, 11' and 11" of the isolator switch are adapted to rotate in the direction indicated by arrows in FIG. 1. As shown best in FIG. 2, the contacts 11, 11' and 11" are secured to the ends of the conductors 20, 21 and 22 which are joined at these ends by the insulator 23. The conductors project through and are carried by the insulator cover 24 having a base flange 25 rotatably seated in the mounting collar 26. The inner collar 27 retains the flange 25 in place while allowing rotation thereof the member 24 so that contact between the contact pairs 11, 12, etc. can be made or broken by rotation as previously described. The opposite ends of the conductors carry further contacts 28 cooperable with further fixed contacts not shown.

What we claim is:

1. In a busbar system, the combination of:
    a support and an insulator carried by said support;
    a busbar attached to said insulator in spaced relation to said support, said busbar comprising a pair of elongate, parallel rods, each having an inner face and an outer face, said outer faces being semicircular and said inner faces being disposed in spaced relation to each other so that said outer faces define a generally cylindrical envelope, said insulator having a portion disposed between said inner faces and said inner faces of the bars each having a longitudinally extending T-slot; and
    means for attaching said busbar to said insulator, said means comprising a pair of bolts having their heads received in the respective T-slots of said bars whereby the attachment may be made at a selected longitudinal position along said busbar.

2. In a busbar system as defined in claim 1 wherein said means also comprises a pair of plates, one associated with each of said bolts and each plate being engaged against a corresponding inner face by its associated bolt, said portion of the insulator being disposed and secured between said plates.

3. In a busbar system as defined in claim 2 wherein said means further includes a sleeve rotatable projecting through said portion of the insulator and sandwiched between said plates whereby said rods and the insulator are relatively rotatable.

4. In a busbar system as defined in claim 1 wherein said support is in the form of an elongate envelope enclosing said insulator, and there being a plurality of busbars for multiple electrical phases, each receiving and being attached to a different portion of said insulator whereby said busbars are spaced apart from each other and from said envelope.

5. In a busbar system as defined in claim 4 wherein said busbars are disposed in a common plane.

6. In a busbar system as defined in claim 5 including a fixed contact secured to each busbar, each fixed contact having a body portion adjacent its associated busbar and an anchor portion projecting between said inner faces of the associated busbar and secured therebetween whereby said body portions lie within a common plane parallel to that of said busbars.

7. In a busbar system as defined in claim 6 wherein said fixed contacts are secured to their associated busbars so that said body portions lie along a circular path in the common plane thereof.

8. In a busbar system as defined in claim 6 wherein each anchor portion is bifurcated to present a pair of spaced legs, each leg being secured to a busbar rod by means of a bolt having its head received in the longitudinal T-slot of the associated bar.

* * * * *